(12) United States Patent
Walker

(10) Patent No.: US 10,118,717 B2
(45) Date of Patent: Nov. 6, 2018

(54) ARTIFICIAL SATELLITE

(71) Applicant: AIRBUS DEFENCE AND SPACE SAS, Les Mureaux (FR)

(72) Inventor: Andrew Walker, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/565,703

(22) PCT Filed: Jun. 1, 2016

(86) PCT No.: PCT/FR2016/051307
§ 371 (c)(1),
(2) Date: Oct. 11, 2017

(87) PCT Pub. No.: WO2016/193618
PCT Pub. Date: Dec. 8, 2016

(65) Prior Publication Data
US 2018/0079534 A1 Mar. 22, 2018

(30) Foreign Application Priority Data
Jun. 2, 2015 (FR) ...................... 15 55013

(51) Int. Cl.
*B64G 1/52* (2006.01)
*B64G 1/50* (2006.01)
(Continued)

(52) U.S. Cl.
CPC ............... *B64G 1/503* (2013.01); *B64G 1/10* (2013.01); *B64G 1/425* (2013.01); *B64G 1/283* (2013.01); *B64G 1/402* (2013.01)

(58) Field of Classification Search
CPC .......... B64G 1/503; B64G 1/425; B64G 1/50; B64G 1/226; B64G 1/58; B64G 1/428;
(Continued)

(56) References Cited

U.S. PATENT DOCUMENTS 4,324,845 A * 4/1982 Stockel ............... H01M 2/1072
429/101
4,580,748 A * 4/1986 Dalby .................... B64G 1/281
165/903
(Continued)

FOREIGN PATENT DOCUMENTS

EP 0 647 559 A1 4/1995
EP 0 966 051 A1 12/1999
(Continued)

OTHER PUBLICATIONS

International Search Report, dated Jul. 19, 2016, from corresponding PCT/FR2016/051307 application.

*Primary Examiner* — Medhat Badawi
(74) *Attorney, Agent, or Firm* — Young & Thiompson

(57) ABSTRACT

Disclosed is an artificial satellite including a battery pack capable of dissipating heat, at least one radiator capable of conveying the heat dissipated by the battery pack into space, and a low-dissipation equipment item having an individual power flux density of less than 250 watts/m$^2$. The satellite includes a thermally insulating cover delimiting, together with the radiator, an interior isothermal zone in which thermal control takes place by radiation, the battery pack and the low-dissipation equipment being arranged in thermally insulating cover. The battery pack has an operating range of between 0° C. and 50° C. and preferably of between 10° C. and 30° C.

20 Claims, 6 Drawing Sheets

(51) Int. Cl.
*B64G 1/42* (2006.01)
*B64G 1/10* (2006.01)
*B64G 1/40* (2006.01)
*B64G 1/28* (2006.01)

(58) Field of Classification Search
CPC ........ B64G 1/506; B64G 1/10; B64G 1/1007; H01M 10/6551; H01M 10/613; H01M 10/6552; H01M 10/6554; H01M 10/465; F28D 15/06
See application file for complete search history.

(56) References Cited

U.S. PATENT DOCUMENTS

| | | | | |
|---|---|---|---|---|
| 4,687,048 A * | 8/1987 | Edelstein | B64G 1/503 | 165/104.25 |
| 4,830,097 A * | 5/1989 | Tanzer | B64G 1/50 | 122/366 |
| 4,880,050 A * | 11/1989 | Nakamura | B64G 1/50 | 165/104.14 |
| 4,899,810 A * | 2/1990 | Fredley | B64G 1/506 | 165/104.14 |
| 5,036,905 A * | 8/1991 | Eninger | B64G 1/50 | 165/104.26 |
| 5,069,274 A * | 12/1991 | Haslett | B64G 1/503 | 165/104.14 |
| 5,117,901 A * | 6/1992 | Cullimore | B64G 1/50 | 165/104.26 |
| 5,310,141 A * | 5/1994 | Homer | B64G 1/425 | 136/222 |
| 5,351,746 A * | 10/1994 | Mackey | B64G 1/503 | 165/104.14 |
| 5,372,183 A * | 12/1994 | Strickberger | B64G 1/503 | 165/41 |
| 5,494,241 A * | 2/1996 | Poulain | B64G 1/503 | 165/41 |
| 5,624,088 A * | 4/1997 | Fiore | B64G 1/10 | 244/158.1 |
| 5,634,612 A * | 6/1997 | Faisant | B64G 1/425 | 244/158.1 |
| 5,682,943 A * | 11/1997 | Yao | B64G 1/50 | 165/104.21 |
| 5,687,932 A * | 11/1997 | Gomes | B64G 1/50 | 165/104.12 |
| 5,732,765 A * | 3/1998 | Drolen | B64G 1/50 | 165/41 |
| 5,735,489 A * | 4/1998 | Drolen | B64G 1/50 | 244/171.8 |
| 5,743,325 A * | 4/1998 | Esposto | B64G 1/22 | 165/41 |
| 5,786,107 A * | 7/1998 | Stafford | H01M 2/1077 | 429/100 |
| 5,787,969 A * | 8/1998 | Drolen | B64G 1/50 | 165/104.26 |
| 5,794,890 A * | 8/1998 | Jones, Jr. | B64G 1/503 | 16/280 |
| 5,806,800 A * | 9/1998 | Caplin | B64G 1/503 | 165/41 |
| 5,806,803 A * | 9/1998 | Watts | B64G 1/503 | 165/41 |
| 5,823,477 A * | 10/1998 | York | B64G 1/503 | 165/171 |
| 5,833,175 A * | 11/1998 | Caplin | B64G 1/10 | 244/158.1 |
| 5,870,063 A * | 2/1999 | Cherrette | B64G 1/1007 | 342/354 |
| 5,884,868 A * | 3/1999 | Long | B64G 1/226 | 244/171.8 |
| 5,950,965 A * | 9/1999 | Epstein | B64G 1/10 | 244/159.4 |
| 5,954,298 A * | 9/1999 | Basuthakur | B64G 1/402 | 165/41 |
| 5,957,408 A * | 9/1999 | Hall | B64G 1/425 | 165/42 |
| 6,003,817 A * | 12/1999 | Basuthakur | B64G 1/50 | 244/164 |
| 6,073,887 A * | 6/2000 | Hosick | B64G 1/50 | 244/164 |
| 6,073,888 A * | 6/2000 | Gelon | B64G 1/50 | 165/104.22 |
| 6,080,962 A * | 6/2000 | Lee | B64G 1/10 | 165/41 |
| 6,102,339 A * | 8/2000 | Wu | B64G 1/503 | 244/171.8 |
| 6,166,907 A * | 12/2000 | Chien | F28D 1/0478 | 165/104.33 |
| 6,173,923 B1 * | 1/2001 | Penera | B64G 1/425 | 244/172.7 |
| 6,196,501 B1 * | 3/2001 | Hall | B64G 1/222 | 244/171.7 |
| 6,260,804 B1 * | 7/2001 | Anderson | B64G 1/1007 | 244/159.4 |
| 6,378,809 B1 * | 4/2002 | Pon | B64G 1/503 | 244/171.8 |
| 6,439,297 B1 * | 8/2002 | Dunbar | B64G 1/50 | 165/41 |
| 6,478,258 B1 * | 11/2002 | Yee | B64G 1/503 | 165/41 |
| 6,776,220 B1 * | 8/2004 | Low | B64G 1/506 | 165/104.33 |
| 6,857,602 B1 * | 2/2005 | Grosskrueger | B64G 1/506 | 165/41 |
| 6,883,588 B1 * | 4/2005 | Low | B64G 1/50 | 165/41 |
| 6,923,249 B1 * | 8/2005 | Porter | B64G 1/425 | 136/246 |
| 7,036,772 B2 * | 5/2006 | Walker | B64G 1/222 | 244/171.8 |
| 7,048,233 B2 * | 5/2006 | Combes | B64G 1/50 | 165/41 |
| 7,080,681 B2 * | 7/2006 | Wert | F28D 15/025 | 165/104.21 |
| 7,143,813 B2 * | 12/2006 | Delgado, Jr. | F28D 15/0275 | 165/41 |
| 7,513,462 B1 * | 4/2009 | McKinnon | B64G 1/1007 | 244/173.1 |
| 7,583,506 B1 * | 9/2009 | Huang | B64G 1/428 | 174/252 |
| 7,762,499 B1 * | 7/2010 | Hentosh | B64G 1/50 | 165/41 |
| 8,342,454 B1 * | 1/2013 | Leimkuehler | B64G 1/50 | 244/159.1 |
| 8,616,271 B2 * | 12/2013 | Hugon | B64G 1/503 | 165/104.25 |
| 9,064,852 B1 | 6/2015 | Hardesty | H01L 21/4871 | |
| 9,352,855 B2 * | 5/2016 | Wong | B64G 1/503 | |
| 9,395,123 B1 | 7/2016 | Leimkuehler | F28D 15/00 | |
| 2002/0145082 A1 | 10/2002 | Bertheux | B64G 1/50 | 244/172.6 |
| 2002/0153128 A1 * | 10/2002 | Low | B64G 1/222 | 165/104.14 |
| 2003/0056943 A1 * | 3/2003 | Dessiatoun | F28D 7/00 | 165/142 |
| 2003/0066638 A1 * | 4/2003 | Qu | C09K 5/14 | 165/186 |
| 2004/0004464 A1 * | 1/2004 | Tsukamoto | H01M 10/44 | 320/162 |
| 2004/0040691 A1 * | 3/2004 | Jacque | B64G 1/506 | 165/42 |
| 2004/0188568 A1 * | 9/2004 | Gayrard | B64G 1/506 | 244/171.8 |
| 2004/0232284 A1 * | 11/2004 | Tjiptahardja | B64G 1/503 | 244/171.8 |
| 2005/0061487 A1 * | 3/2005 | Kroliczek | F25B 23/006 | 165/139 |
| 2005/0166399 A1 * | 8/2005 | Kroliczek | F25B 23/006 | 29/890.07 |

(56) References Cited

U.S. PATENT DOCUMENTS

| | | | |
|---|---|---|---|
| 2005/0211850 A1* | 9/2005 | Sebata | B64G 1/503 244/171.8 |
| 2006/0105706 A1* | 5/2006 | Huang | B64G 1/10 455/12.1 |
| 2007/0017722 A1* | 1/2007 | St. Louis | B60V 1/04 180/116 |
| 2007/0107441 A1* | 5/2007 | Lee | F25B 21/02 62/3.7 |
| 2007/0175610 A1* | 8/2007 | Yeh | H01L 23/473 165/80.4 |
| 2007/0221787 A1* | 9/2007 | McKinnon | B64G 1/222 244/171.8 |
| 2007/0277876 A1* | 12/2007 | Huang | H01L 31/052 136/259 |
| 2008/0128114 A1* | 6/2008 | Lai | G06F 1/20 165/80.4 |
| 2008/0143636 A1* | 6/2008 | Couchman | B64G 1/66 343/915 |
| 2008/0206534 A1* | 8/2008 | Brooks | B32B 17/10018 428/220 |
| 2009/0080155 A1* | 3/2009 | Takahashi | H01L 23/427 361/695 |
| 2009/0090490 A1* | 4/2009 | Yoshida | H01L 23/4735 165/104.33 |
| 2009/0200006 A1* | 8/2009 | Kroliczek | F25B 23/006 165/274 |
| 2010/0001141 A1* | 1/2010 | Jondeau | B64G 1/50 244/158.1 |
| 2010/0019093 A1* | 1/2010 | Russell | B64D 47/00 244/171.8 |
| 2010/0243817 A1* | 9/2010 | McKinnon | B64G 1/50 244/171.8 |
| 2011/0179806 A1* | 7/2011 | Ipposhi | F28D 15/0266 62/3.3 |
| 2013/0112374 A1* | 5/2013 | Murray | B64D 33/12 165/104.26 |
| 2013/0200220 A1* | 8/2013 | Goodzeit | B64G 1/222 244/171.8 |
| 2013/0200221 A1* | 8/2013 | Goodzeit | B64G 1/58 244/171.8 |
| 2013/0233515 A1* | 9/2013 | Aston | B64G 1/503 165/104.21 |
| 2013/0233516 A1* | 9/2013 | Aston | B64G 1/503 165/104.21 |
| 2014/0083651 A1* | 3/2014 | Chaix | F28D 15/02 165/104.21 |
| 2014/0097981 A1* | 4/2014 | Celerier | B64G 1/1007 342/352 |
| 2014/0110531 A1 | 4/2014 | Aston et al. | |
| 2014/0216692 A1* | 8/2014 | Bretl | F28D 15/04 165/104.26 |
| 2014/0224939 A1* | 8/2014 | Wong | B64G 1/506 244/171.8 |
| 2014/0268553 A1* | 9/2014 | Van Pelt | H05K 7/20809 361/679.52 |
| 2014/0299714 A1* | 10/2014 | Wong | B64G 1/44 244/171.8 |
| 2015/0198380 A1* | 7/2015 | Haj-Hariri | B64G 1/50 62/3.2 |
| 2017/0229375 A1* | 8/2017 | Haj-Hariri | H01L 23/427 |
| 2017/0361951 A1* | 12/2017 | Walker | B64G 1/506 |

FOREIGN PATENT DOCUMENTS

| | | |
|---|---|---|
| EP | 2 530 366 A1 | 12/2012 |
| FR | 2 811 963 A1 | 1/2002 |

* cited by examiner

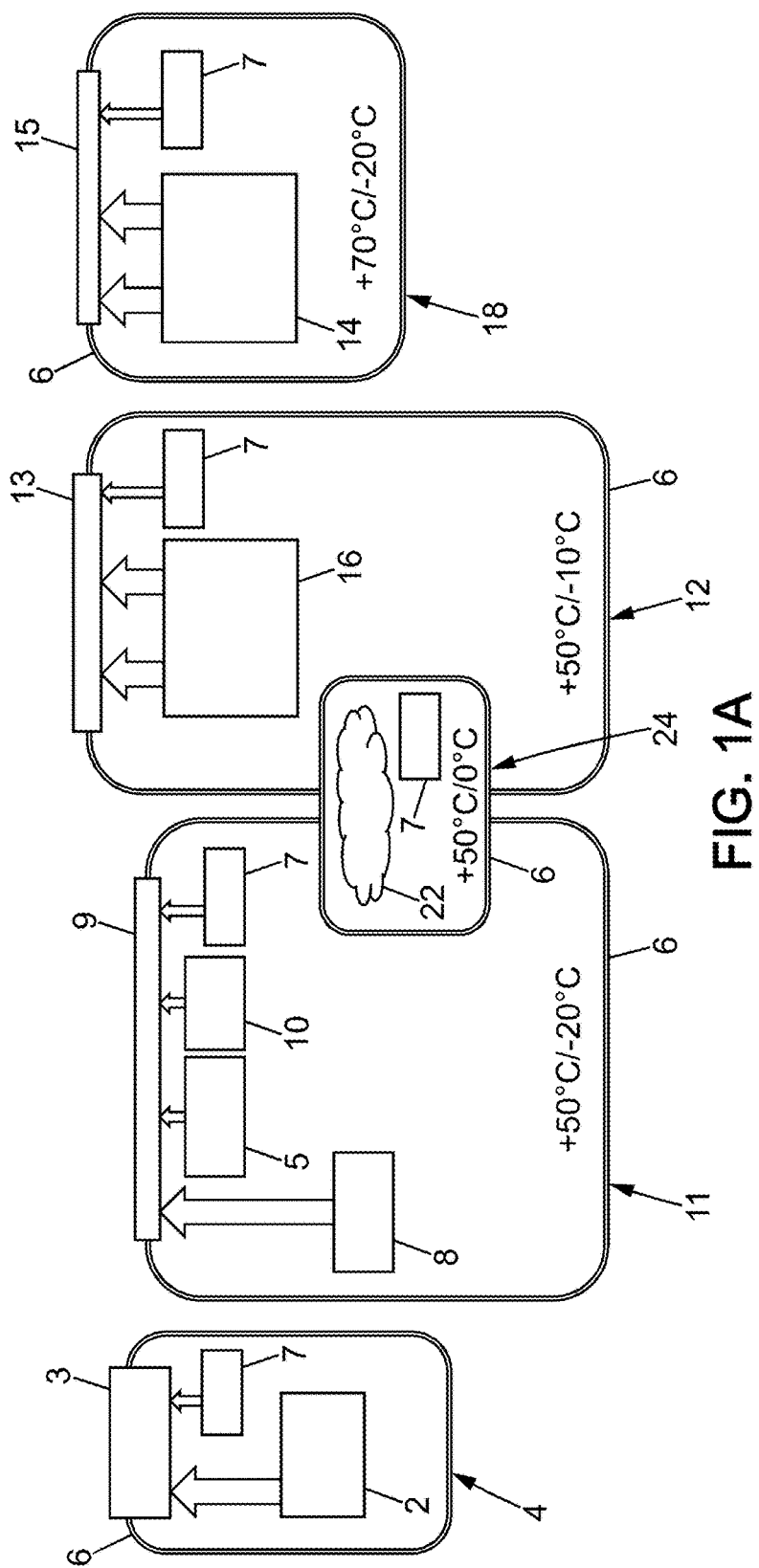

ARTIFICIAL SATELLITE

The present invention is in the field of artificial satellites and particularly in the field of geostationary satellites.

In particular, the present invention refers to the thermal control of a satellite.

Satellites include equipment such as batteries, a payload, an on-board computer, etc. These equipment items must be thermally controlled to ensure proper operation and thus ensure that the satellite in question can complete its mission successfully. Since these equipment items have different operating temperature ranges, they are isolated in compatible thermal zones according to their operating temperatures. These zones are surrounded by multi-layer insulation in thermal contact with a radiator. In order to simplify the implementation of such insulation, equipment items having comparable operating temperature ranges are grouped together in the same zone. Isothermal zones that need to be kept at the coldest temperatures require the largest radiators. Such radiators are cumbersome and make the satellite heavy. Satellite manufacturers therefore place a minimum amount of equipment in the coldest zones.

FIGS. 1A and 1B are schematic diagrams of an example of an arrangement of isothermal zones in satellite 1. According to this example, satellite 1 comprises five types of isothermal zones. Each isothermal zone is surrounded by multi-layer insulation 6 and possibly by a radiator. Each isothermal zone furthermore comprises heating equipment 7.

Consequently, a first type of isothermal zone 4 comprises a set of batteries 2 and a first radiator 3. When batteries 2 are NiH batteries, the first type of zone 4 is kept at temperatures of between −20° C. and −10° C. When batteries 2 are Lithium-Ion batteries, the first type of zone 4 is kept at temperatures of between +10° C. and +30° C.

A second type of isothermal zone 11 comprises reaction wheels 8, an on-board computer 5, an electrical power supply unit 10, and a second radiator 9. This second type of isothermal zone 11 is kept at a temperature of between −20° C. and +50° C.

A third type of isothermal zone 12 comprises the payload 16 operating at low power and a third radiator 13. This third type of isothermal zone 12 is kept at temperatures of between −10° C. and +50° C.

A fourth type of zone 18 comprises the payload 14 operating at high power and a fourth radiator 15. This fourth type of isothermal zone 18 is kept at a temperature of between −20° C. and +70° C.

Lastly, the propellant storage and distribution system 22 is placed in a fifth type of zone referred to as propulsion zone 24. In the present invention, we will use the term "propellant" to refer indifferently to the substance used for propulsion purposes, be it for chemical or plasma propulsion. This propulsion zone is kept at a temperature of between 0° C. and +50° C. The installation of this propulsion zone 24 is particularly lengthy and costly. During such installation, heaters are glued to tanks 26, the valves, and filters 30. Multi-layer insulation 6 is then wrapped around each of these equipment items and on a portion of nozzles 32. Lastly, heaters are placed all along propellant distribution pipes 28 according to a helical arrangement, as shown in FIG. 2. Adhesive strips 36 made of aluminum are glued to the heaters. Multi-layer insulation 6 is then wrapped around pipes 34. The heaters are operated so that the propellant does not freeze. The multi-layer insulation makes it possible to minimize the heating power required to heat the propellant, thus reducing electrical power consumption.

However, installation of the heaters, strips, and multi-layer insulation is done manually on all the pipes between the tanks and nozzles. This installation is therefore very time-consuming. In addition, brackets 34 holding pipes 28 are made of materials with low thermal conductivity that are costly.

The purpose of the present invention is to propose a thermal control solution for all equipment items of a satellite that is simpler to implement, by offering greater freedom in the configuration of the equipment items (for example, location and orientation) on the satellite, while remaining effective and thus making it possible to reduce the time and cost required to manufacture a satellite.

To that end, the invention refers to an artificial satellite comprising at least one battery pack capable of dissipating heat, at least one radiator for conveying the heat dissipated by the battery pack into space, and at least one so-called low-dissipation equipment item having an individual power flux density of less than 250 Watts/m$^2$, characterized in that it comprises a thermally insulating cover delimiting, together with said radiator, an interior isothermal zone in which thermal control is performed by radiation, said battery pack and said low-dissipation equipment item being arranged in said thermally insulating cover, and in that said battery pack has an operating range of between 0° C. and 50° C. and preferably between 10° C. and 30° C.

Advantageously, the installation of a single cover defining a single thermal zone comprising both the battery packs and the low-dissipation equipment, reduces the time and cost of designing the satellite.

Advantageously, the electrical power consumption required to heat the equipment items contained in the cover is reduced compared to the electrical power consumption of these same equipment items when placed in several isothermal zones.

According to a particular embodiment, the battery pack is a Lithium battery pack and more specifically a Lithium-Ion battery pack.

According to a particular embodiment, the low-dissipation equipment comprises a propellant storage and distribution system.

Advantageously, the installation of the interior isothermal zone (which also includes the propulsion) is facilitated. Indeed, this interior isothermal zone contains all the piping connecting the tanks, valves, and engines. Consequently, the pipes no longer need to be thermally wrapped. The cover makes it possible to surround all the small equipment items in the storage and distribution system in one fell swoop and very quickly.

Advantageously, this interior isothermal zone also affords more flexible installation than the old propulsion zone. Indeed, it is possible, for instance, to modify the size of a tank or to change the path of a propellant distribution pipe without having to reinstall the heaters, aluminum strips, and multi-layer insulation.

Advantageously, since the storage and distribution system does not dissipate any heat, it can be added to the isothermal zone containing the battery packs without the need to increase the dissipating surface of the radiators in that zone.

Advantageously, the equipment items contained in the cover are equipment items that exist in all satellites and that form, together with the cover, a standard base to which equipment items can be added, the size of which varies according to the needs of the satellites' missions, such as the payload, on-board computer, etc.

According to a particular embodiment, said propellant storage and distribution system comprises at least one equipment item from among a tank, distribution pipes, valves, filters, and a portion of nozzles.

Furthermore, in reference to FIG. 1B, reaction wheels 8 are generally thermally connected to a radiator via a thermal link 37 such as a heat pipe or metal braid. The thermal link is manually attached to the reaction wheel and the radiator. This attachment is time-consuming to install. In addition, when designing the satellite, if one wishes to change the location or orientation of reaction wheels 8 inside the satellite, thermal link 37 must be removed and reinstalled in a different location or its length needs to be adapted. This work, which is done manually, is also time-consuming and therefore costly.

Consequently, according to a second embodiment, said low-dissipation equipment comprises at least one reaction wheel.

Advantageously, according to this second embodiment, there no longer is any need to attach a thermal link between the reaction wheels and the radiators. The reaction wheels can radiate freely into the first isothermal zone. This arrangement facilitates the assembly of the satellite.

This arrangement also allows for greater flexibility when designing the satellite, since the reaction wheels can be moved easily within the first isothermal zone or oriented differently in order to keep pace with changes in client demand.

Advantageously, since the reaction wheels dissipate little heat, these low-dissipation equipment items can be added to the isothermal zone containing the battery packs without having to substantially increase the dissipation surface of the radiators in that zone.

Advantageously, the satellite according to the second embodiment dispenses with the attachment of the thermal link between the reaction wheels and the radiators and reduces the manufacturing time and manufacturing costs of a satellite.

According to a particular embodiment, the thermally insulating cover is made of a pliable material, preferably multi-layer insulation.

Although the cover has a constant volume, its flexibility allows it to adapt to different shapes of central structures, different shapes of battery packs, different shapes of storage and distribution systems, different shapes of equipment items (for example, equipment items attached to the central structure, or other equipment items), or different shapes of reaction wheels.

According to a particular embodiment, the satellite also comprises heating equipment attached to said radiator.

Advantageously, the heating equipment items are attached directly to the inside plate of the radiators. They heat the plate and thus make it possible to heat all the equipment items contained in the cover.

According to a particular embodiment, the satellite comprises a central structure, at least one propellant tank secured to said central structure, propellant distribution pipes attached at least in part to the central structure, and valves installed on the pipes, and the insulating thermal cover comprises a sheath slipped over said central structure, said sheath containing said central structure, said tank, at least a portion of said pipes, and said valves.

Advantageously, the cover can be put on and removed easily in the event of a change in the satellite design.

Advantageously, the cover can be made in a standard format which can be adapted to different satellite bases regardless of the number and size of the equipment items that it needs to surround. Indeed, given its low weight, installation time is saved (without, however, making the satellite heavier) by defining the largest possible standard size cover (determined by the largest volume to be contained), which can then be used with all possible satellite configurations.

According to a particular embodiment, said sheath has a peripheral edge attached to an upper portion of the first radiator.

According to a particular embodiment, the satellite comprises an anti-Earth face supporting the central structure and in which the thermal insulating cover comprises a substantially flat part of insulating material covering the anti-Earth face, said part made of insulating material being secured to a lower portion of said at least one radiator so as to form, together with said sheath and said at least one radiator, a closed envelope.

According to a particular embodiment, the low-dissipation equipment items of the satellite dissipate a heat flux of less than 40 watts.

The value of 40 watts is the typical radiation dissipation limit (that is, without the help of a heat pipe or without direct connection to a radiator) to avoid having overly cumbersome equipment in the cover.

The invention will be better understood from the following description provided solely as an example and given in reference to the drawings, in which:

FIG. 1A is a schematic view showing thermal zones according to the prior art;

The present invention is in the field of artificial satellites and particularly in the field of geostationary satellites.

Figure 1B:
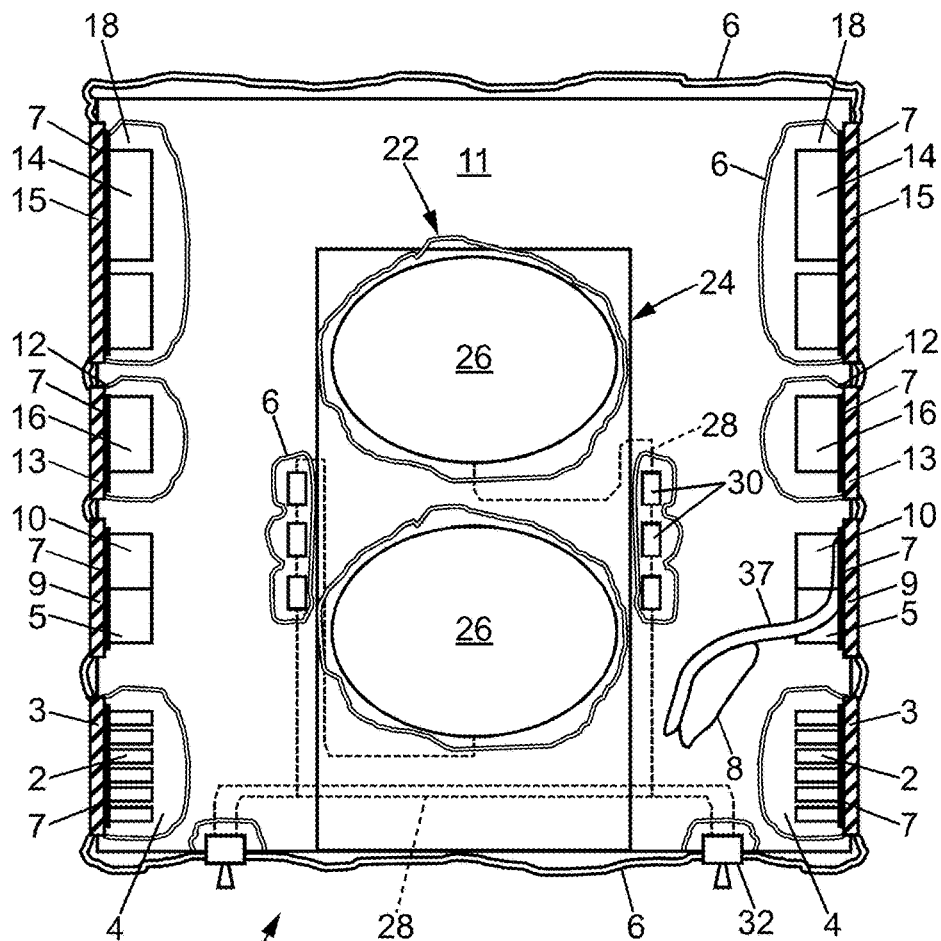
FIG. 1B is a schematic view of an artificial satellite according to the prior art
Figure 2:
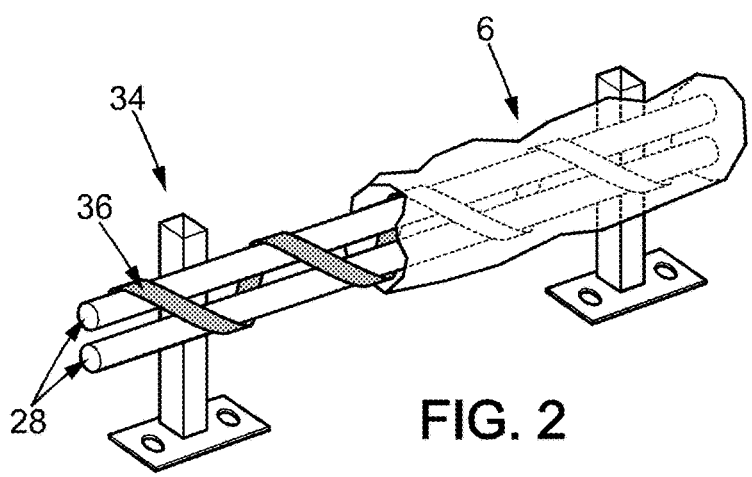
FIG. 2 is a schematic view of a portion of propellant distribution pipes according to the prior art.
Figure 3A:
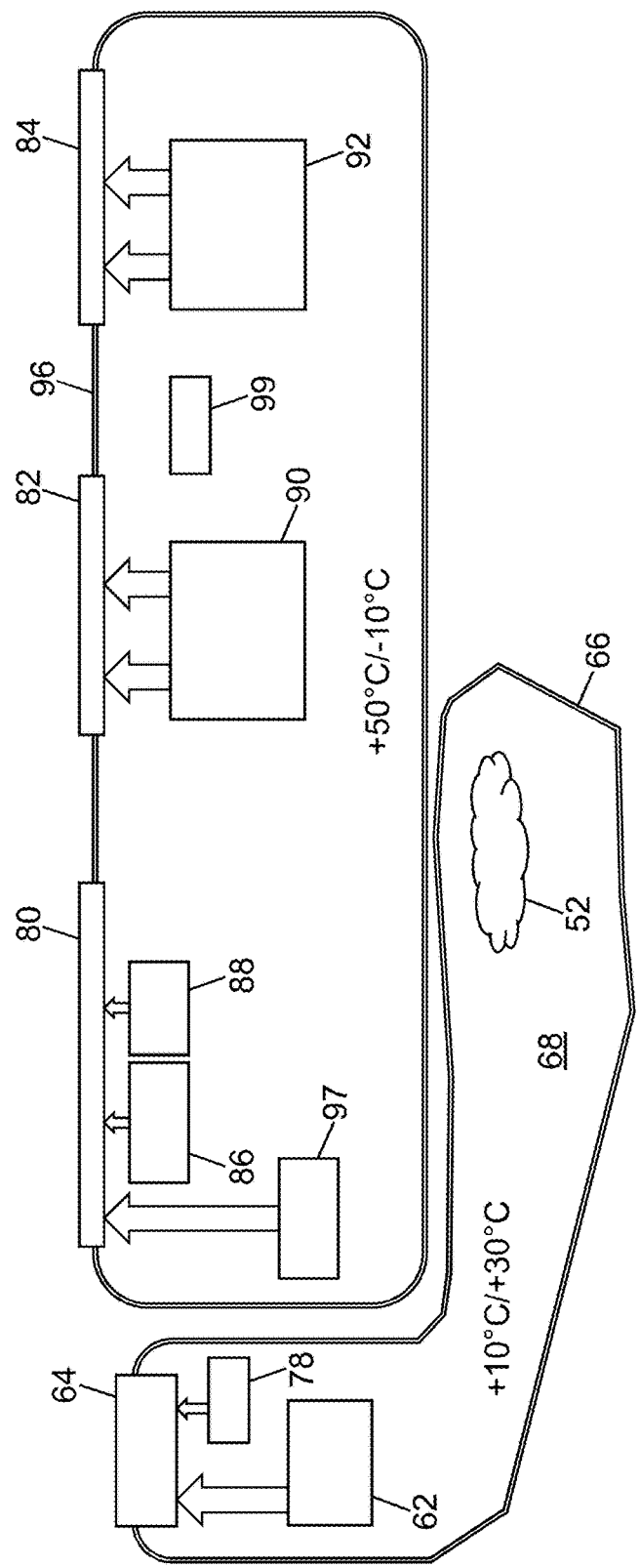
FIG. 3A is a schematic view showing thermal zones according to a first embodiment of the invention.
Figure 3B:
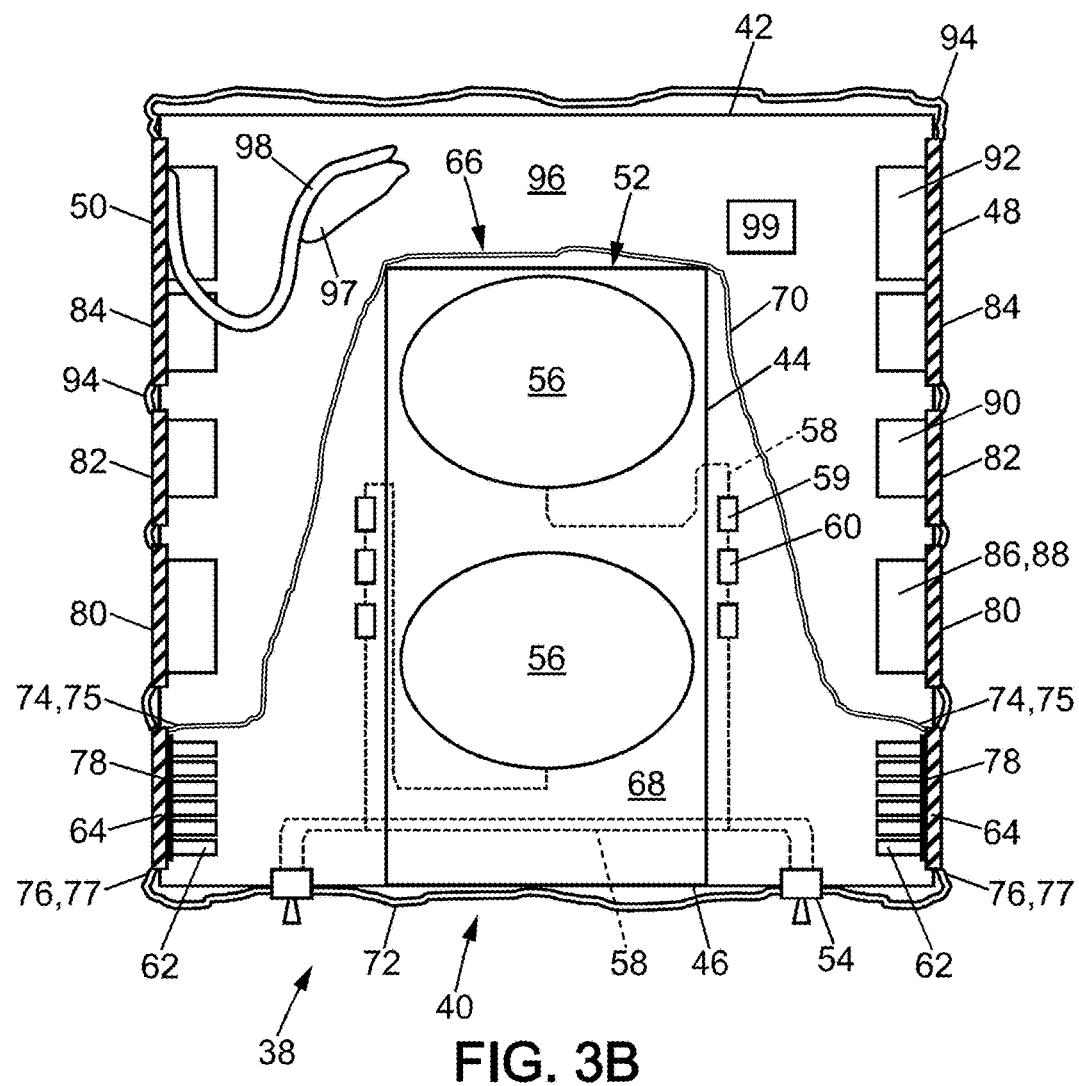
FIG. 3B is a schematic view of an artificial satellite according to the first embodiment of the invention.

In reference to FIG. 3B, artificial satellite 38 according to the first embodiment of the invention consists of a cubic or parallelepiped box 40 comprising an anti-Earth face 46, a hollow central structure 44 resting on anti-Earth face 46, an Earth face 42, East and West faces carrying equipment items (not shown), and North face 48 and South face 50 carrying radiators and equipment items.

The satellite according to the invention in addition comprises a propulsion system which may be a chemical or plasma propulsion system (not shown in the figures) or consist of a combined use of these types of propulsion.

The propulsion system comprises a propellant storage and distribution system 52 and two or more nozzles 54 installed on anti-Earth face 46.

Propellant storage and distribution system 52 comprises two tanks 56 attached to central structure 44, propellant distribution pipes 58 which connect each tank to each nozzle, and valves 59 and filters 60 installed on pipes 58. Individually, these equipment items dissipate little heat (typically less than 3 watts) and also have a low power flux density (a value represented by the thermal power dissipated by the equipment in relation to the dissipation surface of the equipment, with this value being expressed in watt/m$^2$), typically less than 250 watts/m$^2$. In the present patent application, equipment items which have a thermal power flux density of less than 250 watts/m$^2$ are referred to as low-dissipation equipment items. The equipment items of propellant storage and distribution system 52 are therefore low-dissipation equipment items in accordance with the present patent application. These equipment items do not require any conductive thermal control because the removal of their heat can be done effectively by radiative heat exchange when they are placed in a cooler environment. On the contrary, equipment items which individually have an individual power flux density greater than 250 watts/m$^2$ require conductive thermal control and must be installed directly on a radiator or coupled to a radiator by means of conductive means, such as heat pipes or metal braids.

Each of North face 48 and South face 50 is provided with a battery pack 62 capable of dissipating heat during its discharge operations, and a first radiator 64 in thermal contact with battery pack 62 for conveying the heat dissipated by the battery pack into space.

According to the invention, battery pack 62 is chosen so as to be able to function at temperatures of between 0° C. and 50° C., and preferably at temperatures of between +10° C. and +30° C.

Advantageously, battery pack 62 comprises a set of Lithium-Ion batteries. These batteries feature an operating temperature typically between +10° C. and +30° C.

As a variant, any other battery having an operating temperature range compatible with the propulsion system, that is, between 0° C. and +50° C., could be used, such as, for instance, Lithium-Sulfur batteries.

Advantageously, according to the invention, propellant storage and distribution system 52 and battery packs 62 are arranged in a thermally insulating cover or envelope 66 secured to the first two radiators 64 and defining, together with them, a first interior isothermal zone 68.

This cover 66 is made of an insulating material. This material is preferably flexible. Advantageously, this cover 66 is made of a material called Multi Layer Insulation (MLI).

According to the illustrated embodiment example, this thermally insulating cover 66 comprises an upper sheath 70 and a lower part 72 of insulating material. Sheath 70 is advantageously bell-shaped. The sheath is closed at its upper end and flared at its lower end. Sheath 70 has a peripheral edge 74. A portion of this peripheral edge is attached along an upper portion 75 of first radiators 64.

Sheath 70 can be easily slipped over or removed from central structure 44. Once installed, it surrounds the upper portion of central structure 44, tanks 56, pipes 58, valves 59, and filters 60. Sheath 70 may consist of one or a plurality of insulating pieces arranged together so as to form a sealed enclosure.

Part 72 made of insulating material is substantially flat. This part comprises opening through which the nozzles pass. Peripheral edge 76 of this part 72 is attached along a lower portion 77 of the first radiators and to the peripheral edge 74 of the sheath. Consequently, sheath 70, first radiators 64, and part 72 made of insulating material form a closed enclosure defining a three-dimensional space referred to as first isothermal zone 68 in the present patent application. The removal of the heat generated in this cover 66 is done by means of first radiators 64.

In order to keep the temperature in first isothermal zone 68 at the minimum temperature that can be withstood by battery packs 62, heating equipment 78, of the small heater type, are arranged in said cover 66. As described earlier, this minimum temperature is +10° C. when Lithium-Ion battery packs are used.

According to the embodiment example shown in the figures, North face 48 and South face 50 are also provided with a second radiator 80, a third radiator 82, and a fourth radiator 84, to which are connected on-board computer 86, electrical power supply unit 88, payload 90 operating at low power, and payload 92 operating at high power. Layers 94 of multi-layer insulation are attached between each radiator and to Earth face 42 so as to create, together with sheath 70, a second isothermal zone 96.

This second isothermal zone 96 also comprises reaction wheels 97, each of which is connected to a radiator by a thermal link 98 of the heat pipe or metal braid type.

Lastly, this second isothermal zone 96 comprises heating equipment 99 of the small heater type to keep this zone at a temperature of between −10° C. and +50° C.

According to a variant not illustrated, the satellite comprises more than two isothermal zones, each of which being delimited by a layer of multi-layer insulation and a radiator. For example, the satellite may comprise:
- a first isothermal zone identical to the thermal zone illustrated in FIG. 3B,
- a second isothermal zone kept at a temperature of between +50° C. and −20° C.; this second isothermal zone comprises second radiator 80, reaction wheels 97, on-board computer 86, electrical power supply unit 88, and heating equipment 99,
- a third isothermal zone kept at a temperature of between −10° C. and +50° C., the third isothermal zone comprising third radiator 82, the payload operating at low power 90, and heating equipment 99,
- a fourth isothermal zone kept at a temperature of between −20° C. and +70° C., the fourth isothermal zone comprising fourth radiator 84, the payload operating at low power 92, and heating equipment 99.

According to another less advantageous variant, not shown, a single battery assembly and a single first radiator 64 are included in the first isothermal zone, with the battery assembly located on the other side of the satellite being wrapped in its own multi-layer insulation.

As a variant, the low-dissipation equipment items comprise a gyroscope.

Figure 4A:
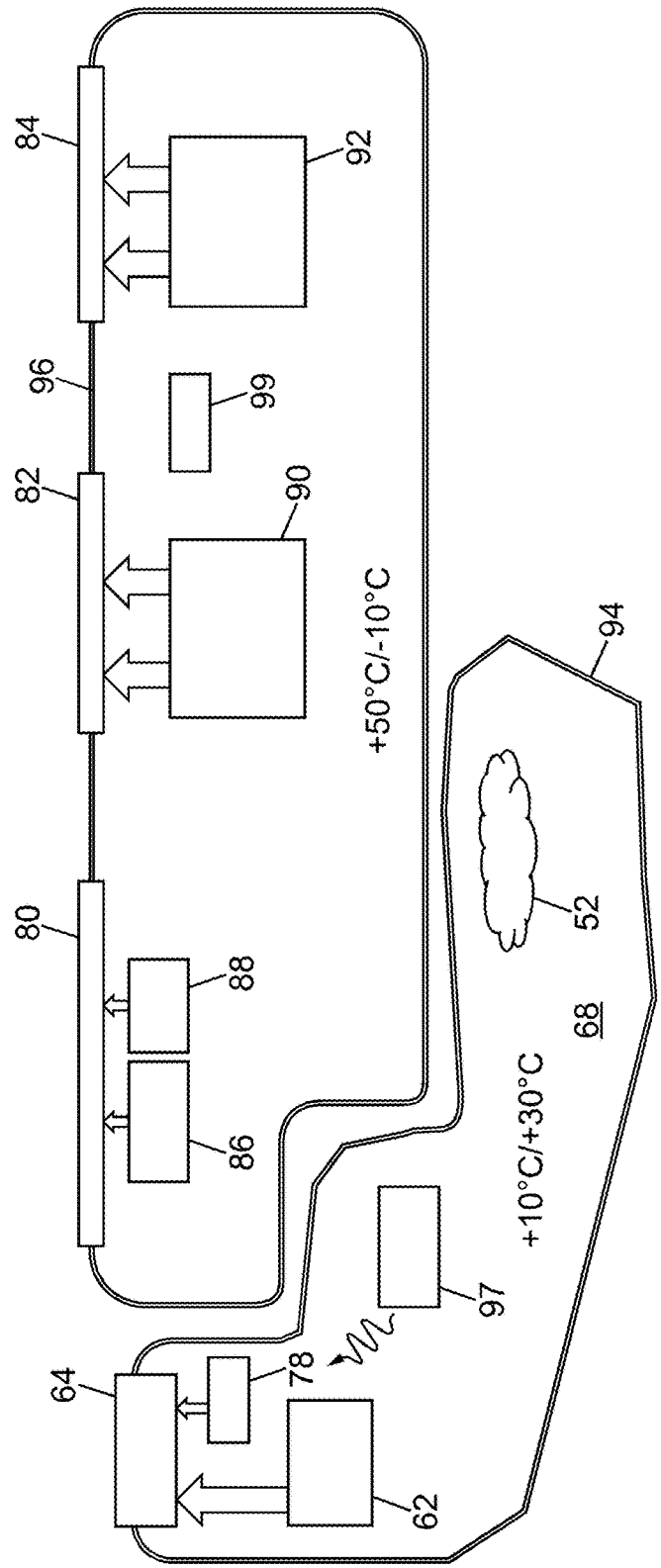
FIG. 4A is a schematic view showing thermal zones according to a second embodiment of the invention.
Figure 4B:
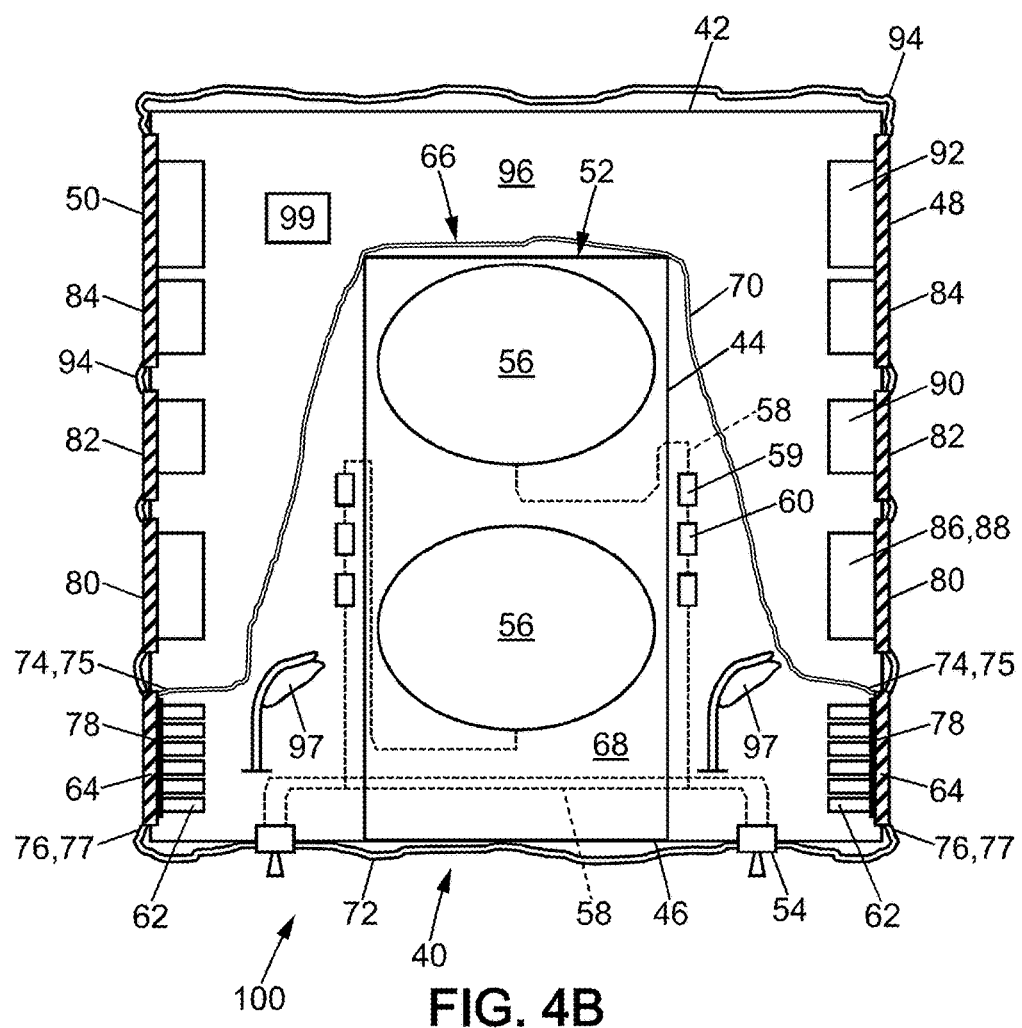
FIG. 4B is a schematic view of an artificial satellite according to the second embodiment of the invention.

FIG. 4B shows an artificial satellite 100 according to a second embodiment of the invention. Artificial satellite 100 according to the second embodiment is identical to satellite 38 according to the first embodiment of the invention, except for the fact that reaction wheel or wheels 97 are placed in first isothermal zone 68 instead of in second isothermal zone 96.

Each reaction wheel 97 has a thermal power flux density of less than 250 watts/m$^2$. The reaction wheel or wheels are therefore part of the low-dissipation equipment items in accordance with the present patent application.

This second embodiment will not be described in detail. The components of satellite 100 according to the second embodiment, which are identical or similar to the components of satellite 38 according to the first embodiment, include the same reference numbers and will not be described a second time.

As in the case of the first embodiment, the satellite according to the second embodiment may include several isothermal zones. For example, the satellite may include four isothermal zones as described above. Still, in this case reaction wheels 97 are placed in the first isothermal zone.

As a variant, nozzles 54 or additional nozzles are installed on a lower portion of North face 48, South face 50, the East face, or the West face. In this case, nozzles 54 and/or the additional nozzles are placed below sheath 70 and are contained in first isothermal zone 68.

The invention claimed is:

1. An artificial satellite comprising:
   at least one battery pack configured to dissipate heat,
   at least one radiator configured to convey the heat dissipated by the battery pack into space, and
   at least one low-dissipation equipment item having an individual power flux density of less than 250 watts/m$^2$,
   wherein the artificial satellite comprises a thermally insulating cover delimiting, together with said radiator, an interior isothermal zone in which thermal control takes place by radiation, and
   wherein said battery pack and said low-dissipation equipment are arranged in said thermally insulating cover, and said battery pack has an operating range of between 0° C. and 50° C.

2. The artificial satellite according to claim 1 wherein said battery pack is a Lithium battery pack.

3. The artificial satellite according to claim 1, wherein said low-dissipation equipment comprises a propellant storage and distribution system.

4. The artificial satellite according to claim 3, wherein said propellant storage and distribution system comprises at least one equipment item from among a tank, distribution pipes, valves, filters, and a portion of nozzles.

5. The artificial satellite according to claim 1, wherein said low-dissipation equipment comprises at least one reaction wheel.

6. The artificial satellite according to claim 1, wherein the thermally insulating cover is made of a flexible material.

7. The artificial satellite according to claim 1, which furthermore comprises heating equipment attached to said radiator.

8. The artificial satellite according to claim 1, which comprises:
   a central structure,
   at least one propellant tank secured to said central structure,
   propellant distribution pipes attached at least in part to the central structure, and
   valves installed on the pipes, and
   wherein the insulating thermal cover comprises a sheath slipped over said central structure, said sheath containing:
   said central structure, said tank, at least a portion of said pipes, and said valves.

9. The artificial satellite according to claim 8, wherein said sheath has a peripheral edge attached to an upper portion of the first radiator.

10. The artificial satellite according to claim 9, which comprises:
    an anti-Earth face supporting the central structure,
    wherein the thermal insulating cover comprises a substantially flat part of insulating material covering the anti-Earth face, wherein said part made of insulating material is secured to a lower portion of said at least one radiator so as to form, together with said sheath and said at least one radiator, a closed envelope.

11. The artificial satellite according to claim 1, wherein the low-dissipation equipment items of the satellite dissipate a heat flux of less than 40 watts.

12. The artificial satellite according to claim 2, wherein said low-dissipation equipment comprises a propellant storage and distribution system.

13. The artificial satellite according to claim 2, wherein said low-dissipation equipment comprises at least one reaction wheel.

14. The artificial satellite according to claim 3, wherein said low-dissipation equipment comprises at least one reaction wheel.

15. The artificial satellite according to claim 4, wherein said low-dissipation equipment comprises at least one reaction wheel.

16. The artificial satellite according to claim 2, wherein the thermally insulating cover is made of multi-layer insulation.

17. The artificial satellite according to claim 3, wherein the thermally insulating cover is made of multi-layer insulation.

18. The artificial satellite according to claim 2, which furthermore comprises heating equipment attached to said radiator.

19. The artificial satellite according to claim 1 wherein said battery pack has an operating range of between 10° C. and 30° C.

20. The artificial satellite according to claim 2 wherein said battery pack is a Lithium-Ion battery pack.

* * * * *